(12) United States Patent
Shenoy et al.

(10) Patent No.: US 9,419,445 B2
(45) Date of Patent: Aug. 16, 2016

(54) METHOD AND SYSTEM FOR EXTENDING BATTERY POWER AT CELL SITES

(71) Applicant: TEJAS NETWORKS LTD, Bangalore (IN)

(72) Inventors: Vivek Shenoy, Bangalore (IN); Vinod Arithottathumananeelakantan Namboodiri, Bangalore (IN); Patil Makarand Krishna, Bangalore (IN)

(73) Assignee: TEJAS NETWORKS LTD, Bangalore (IN)

( * ) Notice: Subject to any disclaimer, the term of this patent is extended or adjusted under 35 U.S.C. 154(b) by 179 days.

(21) Appl. No.: 14/168,579

(22) Filed: Jan. 30, 2014

(65) Prior Publication Data

US 2015/0214753 A1    Jul. 30, 2015

(51) Int. Cl.
*H02J 7/00* (2006.01)
*H01M 10/12* (2006.01)
*H01M 10/0525* (2010.01)
*H01M 10/44* (2006.01)

(52) U.S. Cl.
CPC ......... *H02J 7/0003* (2013.01); *H01M 10/0525* (2013.01); *H01M 10/121* (2013.01); *H01M 10/441* (2013.01); *H02J 7/0014* (2013.01); *H02J 7/0016* (2013.01); *H02J 7/0054* (2013.01); *H02J 7/0029* (2013.01); *Y02E 60/122* (2013.01); *Y02E 60/126* (2013.01)

(58) Field of Classification Search
USPC .......................................... 320/106, 107, 162
See application file for complete search history.

(56) References Cited

U.S. PATENT DOCUMENTS

| 2014/0167503 | A1* | 6/2014 | Redpath | H02J 9/06 307/23 |
| 2014/0186659 | A1* | 7/2014 | Dhar | H01M 16/00 429/9 |

* cited by examiner

*Primary Examiner* — Brian Ngo
(74) *Attorney, Agent, or Firm* — Barry Choobin; Patent 360 LLC

(57) ABSTRACT

The embodiments herein provide a method and system for extending battery power at cell sites. The method for extending battery power at cell sites comprises providing a combination of a valve-regulated lead-acid (VRLA) battery and a Li-ION battery, mixing cell chemistry of the VRLA battery and the Li-ION battery and charging the VRLA-Li-ION battery combination with a single charger circuit. The method further comprises providing a rectifier to both the VRLA battery and the Li-ION battery and activating each battery based on the available power. The Li-ION battery and the VRLA battery are the primary battery and secondary battery. The charging current through the VRLA battery is regulated by varying a pulse width of a high current switch based on the current read through the current sensor attached to a VRLA current path.

6 Claims, 4 Drawing Sheets

METHOD AND SYSTEM FOR EXTENDING BATTERY POWER AT CELL SITES

CROSS-REFERENCE TO RELATED APPLICATIONS

The embodiments herein claims the priority of the Indian Provisional Patent Application with serial number No 465/CHE/2013 filed on Feb. 4, 2013 having the title "A Method and System for Extending Battery Power at Cell Sites". The contents of both the abovementioned Indian Provisional Patent Applications are incorporated by entirety as reference herein.

BACKGROUND

1. Technical Field

The embodiments herein generally relate to the field of rechargeable batteries and particularly relates to a method and system for extending battery power. The embodiments herein more particularly relates to a method and system for extending battery power at cell sites using a combination of VRLA and Li-ION batteries.

2. Description of the Related Art

Conventionally, cell sites are powered by VRLA batteries when there is no grid power available, Newer battery types like Li-ION are available today that have better charge/discharge characteristics than VRLA. However, the problem of using the existing VRLA batteries at the cell site, along with the newer Li-ION batteries is a challenge.

Another short coming using this approach is that the system cannot charge different mix of batteries simultaneously as mixing battery chemistries, with a single battery charger leads to either battery failure or reduced backup time. Another known method for mixing cell chemistries uses multiple rectifiers i.e. using two separate rectifiers for each of the cell chemistries and bringing each battery online when required. However, this adds up to extra cost to the solution.

In such a situation, either dual battery chargers are required or controlling the batter charger programmatically to adjust for cell chemistries is required. Both are problematic as a new battery charger adds to cost of the system and control of the battery charger is not supported universally.

Further, in practice there is the use of a common low charge current safely recharging both types of batteries so they can co-exist within a single charging system. The rate of charging depends upon the magnitude of the charging current, the battery technology and the chemistry and the effective cell volumes that are enclosed in the battery pack. It is conceptualized that the charging time of the batteries can be reduced by using a higher charging current. However, there is a limit to the charging current that can be used, due to the cell chemistry and technology on which the battery cells are based.

In view of the foregoing, there is a need for a method and system for extending battery power at cell sites. There also is a need to provide a method and system for extending battery power at cell sites by mixing cell chemistries of different batteries. Further, there exists a need to provide a method and system for mixing of cell chemistries and a charging the combination of VRLA and Li-ION batteries with a single battery charger.

The abovementioned shortcomings, disadvantages and problems are addressed herein and which will be understood by reading and studying the following specification.

OBJECTS OF THE EMBODIMENTS

The primary objective of the embodiments herein is to provide a method and system for extending battery power at cell sites by mixing different cell chemistries.

Another objective of the embodiments herein is to provide a method and system for mixing cell chemistries of the VRLA battery and the Li-ION battery.

Another objective of the embodiments herein is to provide a method and system for charging the combination of VRLA and Li-ION batteries with a single battery charger.

Yet another objective of the embodiments herein is to provide a method for mixing cell chemistries and charging the combination of VRLA and Li-ION batteries with a single rectifier.

Yet another objective of the embodiments herein is to provide a method for extending battery power at cell sites which eliminates loop currents and energy wastage.

These and other objectives and advantages of the present disclosure will become readily apparent from the following detailed description taken in conjunction with the accompanying drawings.

SUMMARY

The various embodiments herein provide a method for extending battery power at cell sites. The method for extending battery power at cell sites comprises the steps of providing a combination of a valve-regulated lead-acid battery (VRLA) and a Li-ION battery, mixing cell chemistry of the VRLA battery and the Li-ION battery and charging the VRLA-Li-ION battery combination with a single charger circuit.

According to an embodiment herein, the method for extending battery power at cell sites further comprises providing a rectifier for the cell chemistries of both the VRLA battery and the Li-ION battery and activating each of the VRLA battery and the Li-ION battery based on the battery power available in each of the VRLA battery and the Li-ION battery.

According to an embodiment herein, the charging of the VRLA-Li-Ion battery combination comprises defining a preset current limit for the charger circuit, charging the Li-Ion battery and the VRLA battery with a float voltage, monitoring a charging current and a terminal voltage of the VRLA battery, determining a frequency and a duty cycle of one or more pulses for pulse charging of VRLA batteries, bringing the VRLA battery to an offline mode by determining a state of charge of the VRLA batter and making a pulse width to zero, discharging the Li-ION Battery at an initial stage and using the VRLA battery to power the load as Li-Ion battery discharges to a pre-set charge limit.

According to an embodiment herein, the Li-ION battery is charged with a predefined current limit of the charger circuit within a rectifier system.

According to an embodiment herein, the VRLA battery is charged using the pulse charging method to achieve a reduced current limit to the predefined current limit set on the charger circuit, for the Li-ION battery, within the rectifier by varying the pulse width.

The various embodiments herein provide a system fur extending battery power at cell sites. The system for extending battery power at cell sites comprises a Li-ION battery and a VRLA battery in combination and a charger circuit for the Li-ION and VRLA battery combination. The charger circuit comprises a Battery Control Module (BCM), an Energy Management Controller (EMC), a VRLA Controller Unit (VCU), at least two switches and a rectifier for the cell chemistries of both the VRLA battery and the Li-ION battery. The charger circuit eliminates battery loop currents due to different voltage and state of charge characteristics of each battery chemistry type thereby extending the battery power.

According to an embodiment herein, the Battery Control Module (BCM) monitors the status of the charging current, discharging current, a voltage, state of charge, state of health of the Li-Ion battery.

According to an embodiment herein, the Li-ION battery is the primary battery and the VRLA battery is the secondary battery.

According to an embodiment herein, the VRLA Controller Unit (VCU) comprises a voltage sensor to determine a pack voltage of the VRLA battery, the state of charge of the batteries and the state of health of the batteries, a current sensor to calculate a peak and an average charging and the discharging current, a Pulse Width Modulation (PWM) control to a high current MOSFET switch, a communication towards the EMC to send and receive the command, status, event and alarm information of the Li-ION and VRLA batteries with each other and a disconnect relay to protect the VRLA battery.

According to an embodiment herein, the Energy Management Controller (EMC) is connected to the VRLA Controller Unit (VCU) through an RS-232 Serial Port.

According to an embodiment herein, the charging current through the VRLA battery is regulated by varying a pulse width of a high current switch based on the current read through the current sensor attached to a VRLA current path.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
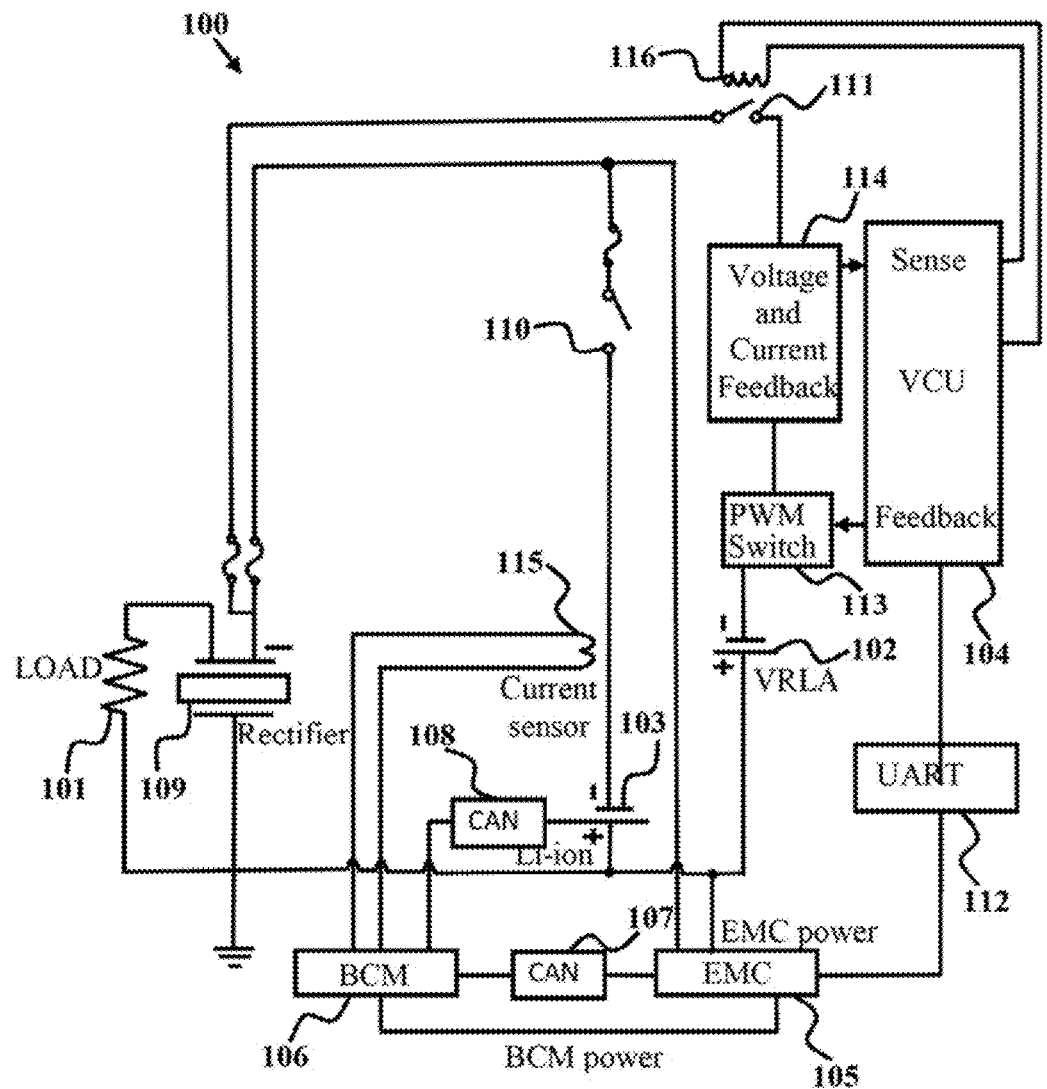
FIG. 1 is a circuit diagram illustrating a system for extending battery power by limiting a charging current to the VRLA battery through a pulse charging method, according to an embodiment herein.

Although the specific features of the present invention are shown in some drawings and not in others. This is done for convenience only as each feature may be combined with any or all of the other features in accordance with the present invention.

DETAILED DESCRIPTION in the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following, detailed description is therefore not to be taken in a limiting sense.

The various embodiments herein provide a method for extending battery power at cell sites. The method for extending battery power at cell sites comprises the steps of providing a combination of a valve-regulated lead-acid battery (VRLA) and a Li-ION battery, mixing cell chemistry of the VRLA battery and the Li-ION battery and charging the VRLA-Li-ION battery combination with a single charger circuit.

The method for extending battery power at cell sites further comprises the steps of providing a rectifier for the cell chemistries of both the VRLA battery and the Li-ION battery and activating each of the VRLA battery and the Li-ION battery based on the battery power available in each of the VRLA battery and the Li-ION battery. Here charging of the VRLA-Li-Ion battery combination comprises the steps of defining a pre-set current limit for the charger circuit, charging the Li-Ion battery and the VRLA battery with a float voltage, monitoring a charging current and a terminal voltage of the VRLA battery, determining a frequency and a duty cycle of one or more pulses for pulse charging of VRLA batteries, bringing the VRLA battery to an offline mode by determining a state of charge of the VRLA battery and making a pulse width to zero, discharging the Li-ION Battery at an initial stage and using the VRLA battery to power the load as Li-Ion battery discharges to a pre-set charge limit.

The Li-ION battery is charged with a predefined current limit of the charger circuit within a rectifier system.

The VRLA battery is charged using the pulse charging method to achieve a reduced current limit to the predefined current limit set on the charger circuit, for the Li-ION battery, within the rectifier by varying the pulse width.

The system for extending battery power at cell sites comprises a Li-ION battery and a VRLA battery in combination and a charger circuit for the Li-ION and VRLA battery combination. The charger circuit comprises a Battery Control Module (BCM), an Energy Management Controller (EMC), a VRLA Controller Unit (VCU), at least two switches and a rectifier for the cell chemistries of both the VRLA battery and the Li-ION battery. The charger circuit eliminates battery loop currents due to different voltage and state of charge characteristics of each battery chemistry type thereby extending the battery power.

The Battery Control Module (BCM) monitors the status of the charging current, discharging current, a voltage, state of charge, state of health of the Li-Ion battery.

The Li-ION battery is the primary battery and the VRLA battery is the secondary battery.

The VRLA Controller Unit (VCU) herein comprises a voltage sensor to determine a pack voltage of the VRLA battery, the state of charge of the batteries and the state of health of the batteries, a current sensor to calculate a peak and an average charging and the discharging current, a Pulse Width Modulation (PWM) control to a high current MOSFET switch, a communication towards the EMC to send and receive the command, status, event and alarm information of the Li-ION and VRLA batteries with each other and a disconnect relay to protect the VRLA battery.

The Energy Management Controller (EMC) is connected to the VRLA Controller Unit (VCU) through an RS-232 Serial Port.

The charging current through the VRLA battery is regulated by varying a puke width of a high current switch based on the current read through the current sensor attached to a VRLA current path.

FIG. 1 is a circuit diagram illustrating a system for extending battery power by limiting a charging current to the VRLA battery through a pulse charging method, according to an embodiment herein. The charging current to the VRLA battery is limited through the pulse charging method by varying pulse width to achieve the required average current.

The circuit 100 comprises Li-ION battery 101 as the primary battery, a VRLA battery 102 as the secondary battery, load 100 and a single rectifier 109. The Li-ION battery 101 is monitored by a Battery Control module (BCM) 106 through a Controller Area Network CAN Interface 108 and the status of charging/discharging current, voltage, state of charge, state of health etc are reported to the Energy Management Controller (EMC) 105 through a Controller Area Network (CAN) Interface 107 as shown in FIG. 1. The BCM module 106 monitors the status of charging/discharging current through the current sensor 115.

According to an embodiment herein, the VCU (VRLA Controller Unit) 104 is adopted in the circuit 100 for sensing voltage and current from the voltage and current feedback module 114, providing control to the high current switch with PWM capability 113, communicating towards the EMC 105 through UART 112 over RS-232 lines and driving for safety disconnect relay. The voltage sense is used to determine the peak voltage of the battery and the state of charge and state of health of the batteries. The current sense is used to calculate the peak and the average charging and the discharging currents, based on this readout values the pulse width of the switch is controlled. The PWM control to the high current MOSFET switch 113 is used to vary the ON time to achieve the 0.1 CA average current through the battery at different SoC and float potential of it. The communication towards the EMC 105 is to send and receive the command, status, event and alarm information of the batteries (102 and 103) each other, The drive for safety disconnect relay protects the VRLA battery 102 from extreme conditions that voids the safety of the system. The EMC 105 is connected to the VCU 104 through UART 112 RS-232 Serial Port as shown in FIG. 1.

When the system is started, the C1 110 is closed and the C2 111 is open. When the Li-ION battery 103 is brought to the required level, then the VRLA battery 102 is brought online by closing the C2 111. The charging current through the VRLA batteries 102 are regulated to the required value by varying the pulse width of the high current switch 113 based on the current read through the current sensor 116 attached to the VRLA battery current path. When the SoC of the VRLA battery gets higher, the width of the pulse reduces and finally the current reaches zero. Then the pulse width is brought to zero to take the VRLA battery 102 offline. When the Li-ION battery 102 is getting discharged, the VCU 104 waits for the EMC 105 to send the command to bring the VRLA battery 102 online. When the VRLA battery 102 is brought online, the Li-ION battery 103 is taken offline by opening C1 110 to avoid the loop current between the batteries (102 and 103). In any case of extreme situations, the C2 111 is opened up to protect the VRLA battery 102.

Figure 2:
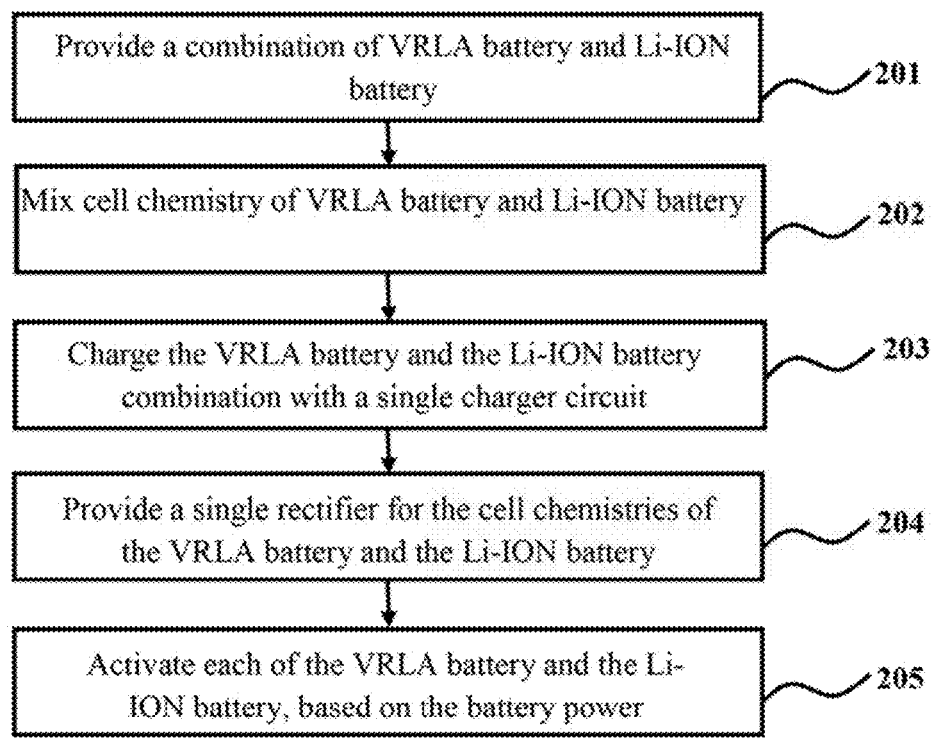
FIG. 2 is a flowchart illustrating a method for extending battery power at cell sites, according to an embodiment herein.

FIG. 2 is a flowchart illustrating a method for extending battery power at cell sites, according to an embodiment herein. The method for extending battery power at cell sites comprises the steps of providing a combination of a valve-regulated lead-acid battery (VRLA) and a Li-ION battery (201), mixing cell chemistry of the VRLA battery and the Li-ION battery (202), charging the VRLA-Li-ION battery combination with a single charger circuit (203), providing a rectifier for the cell chemistries of both the VRLA battery and the Li-ION battery (204) and activating each of the VRLA battery and the Li-ION battery based on the battery power available in each of the VRLA battery and the Li-ION battery (205).

According to an embodiment herein, the Li-ION and VRLA batteries are charged using a single charger. The charger is set for the current limit and float voltage required for Li-ION battery and the VRLA battery is charged using a pulse charging method. The charging current and the terminal voltage of the VRLA battery is monitored to determine the frequency and duty cycle of the pulses and when the VRLA battery gets charged, the duty cycle is lowered until the battery charging current drops to nearly zero i.e. VRLA battery is now on float mode.

During discharge, the Li-ION battery is discharged first and the VRLA battery is kept offline. When the Li-ION battery exhausts, at a pre-determined user-set limit the Li-ION battery is taken out of service and the VRLA battery is used to power the load. This scheme eliminates battery loop currents due to different voltage vs. state of charge characteristics of each battery chemistry type and consequently energy wastage.

Figure 3:
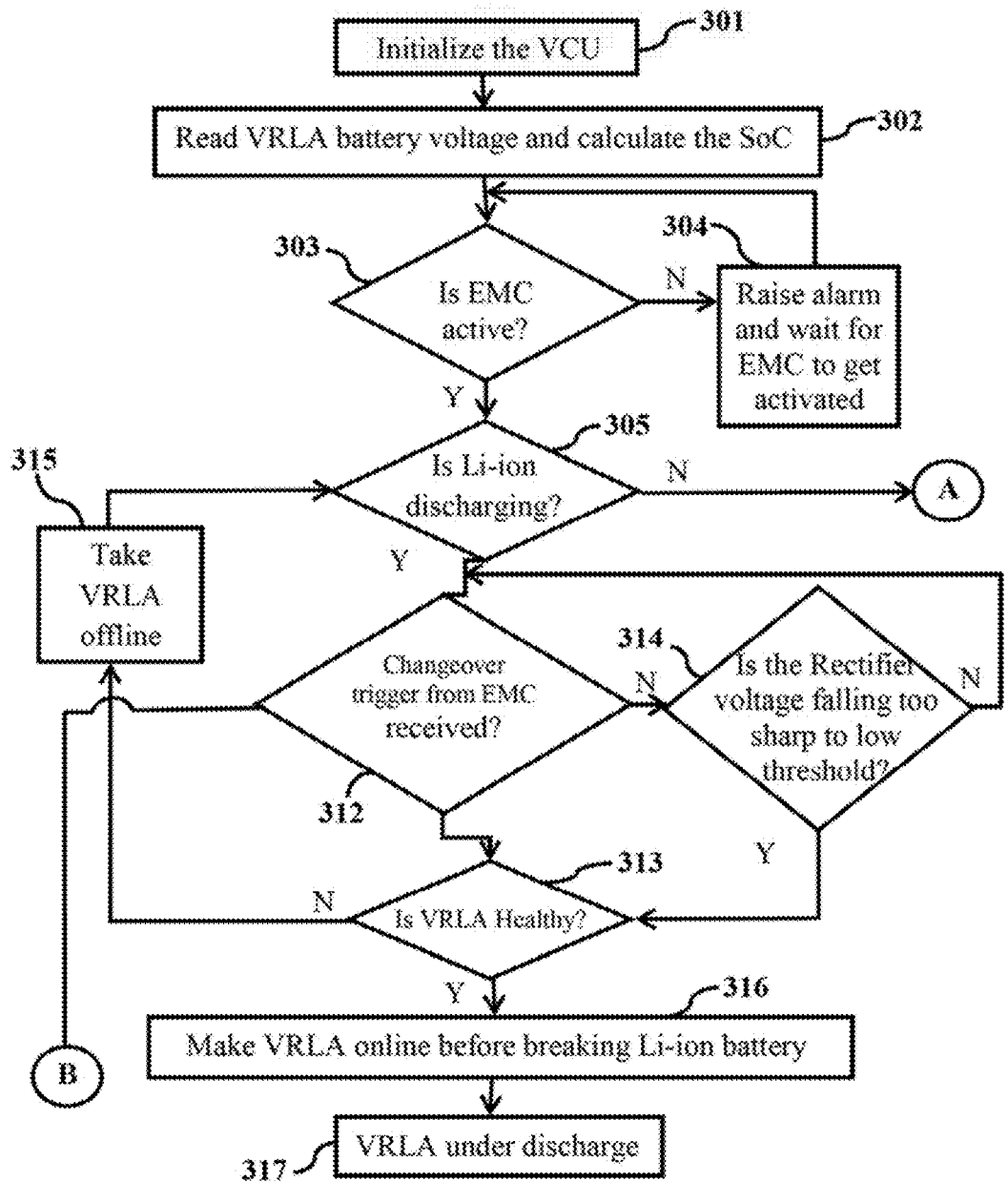
FIG. 3 and FIG. 4 are a flowchart illustrating a method for limiting a charging current to the VRLA battery through a pulse charging method by varying pulse width, according to an embodiment herein.
Figure 4:
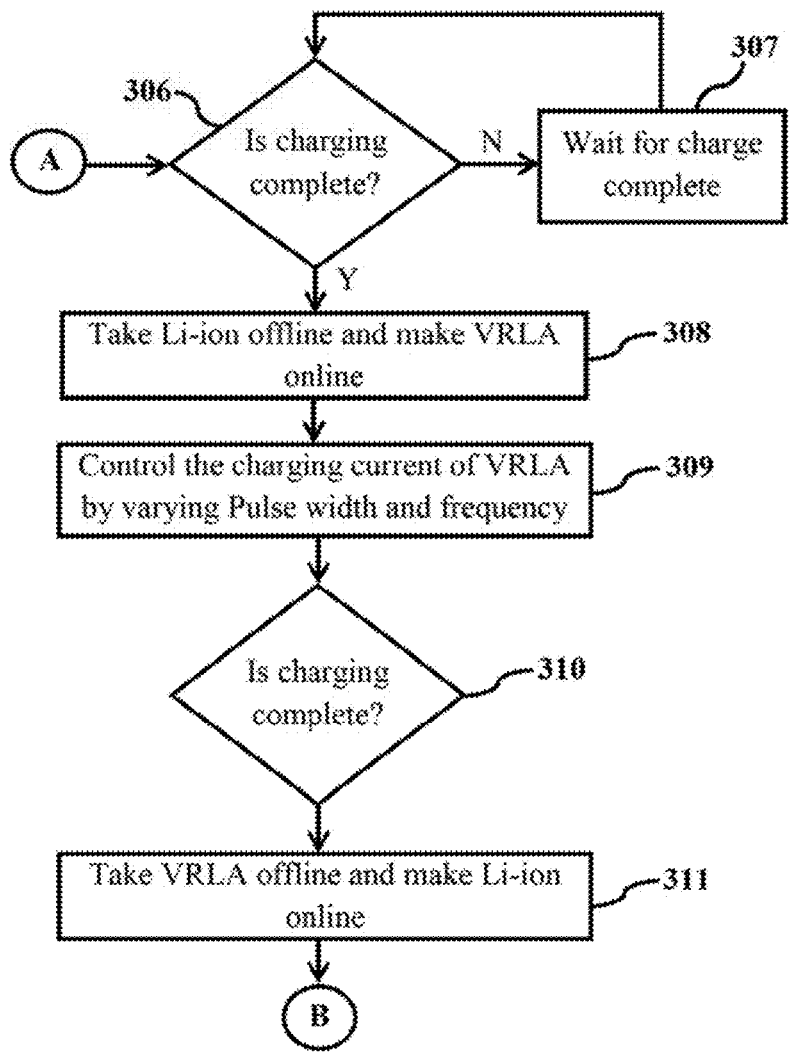

FIG. 3 is a flowchart illustrating a method for limiting a charging current to the VRLA battery through a pulse charging method by varying pulse width, according to an embodiment herein. The method for extending battery power at cell sites comprises the steps of providing a combination of a valve-regulated lead-acid battery (VRLA) and a Li-ION battery, mixing cell chemistry of the VRLA battery and the Li-ION battery, charging the VRLA-Li-ION battery combination with a single charger circuit, providing a rectifier for the cell chemistries of both the VRLA battery and the Li-ION battery and activating each of the VRLA battery and the Li-ION battery based on the battery power available in each of the VRLA battery and the Li-ION battery.

According to an embodiment herein, method for extending battery power at cell sites comprises the steps of initializing the VCU (301) and reading the VRLA battery voltage, calculating the SoC (302) and then checking whether EMC is active or not (303). If EMC is not active, then the system raises alarm and waits until EMC gets activated (304). The system then checks whether Li-ION battery is discharging (305). If the Li-ION battery is not discharging then the system checks whether the Li-ION battery charging is completed or not (306). If the Li-ION battery charging is not completed, then the system waits for the Li-ION battery to get charged completely (307). When the Li-ION battery is completely charged, then the Li-ION battery is made offline and VRLA battery is made online for charging (308). The charging current of the VRLA hatter is controlled by varying Pulse Width and Frequency (309). When the VRLA battery is charged completely (310), then the VRLA battery is made offline and Li-ION battery is made online for charging (311). The system checks whether changeover trigger from EMC is received (312). When the changeover trigger is received form EMC, then the system checks whether the VRLA is healthy (313) or else the system checks whether the rectifier voltage is falling too sharp to low threshold (314). If rectifier voltage is not falling too sharp to low threshold, then the system checks again whether the changeover trigger front EMC is received or not (312). If rectifier voltage is falling too sharp to low threshold, then the system re-checks whether the VRLA battery is healthy or not (313). If the VRLA battery is not healthy, then the system takes the VRLA battery to offline mode (315) and checks whether Li-ION battery is discharging or not (305). If the Li-ION batter is discharging, then system checks again whether changeover trigger from EMC is received or not (312). If the VRLA battery is healthy, then the system takes the VRLA battery to online mode before breaking the Li-ION battery (316) and the VRLA battery is under discharging now (317). The system checks again whether VRLA battery is healthy or not (313) and the process continues.

According to an embodiment herein, consider an example wherein the cell site equipments are powered off a −48V DC grid. For VRLA batteries, the charging characteristics per cell are as follows. The battery is initially charged with a constant current of 0.1 CA rate and switched over to constant voltage mode by giving 2.23 volts per cell. For a typical 48 Volt, 300 AH bank, the Constant Current and Constant Voltage settings is as given below:

Constant Voltage Set point=No. of cells*Charge Voltage per cell i.e. 24*2.3=54.6 Volts Constant Current Set point=Charge Current Rate*Capacity (in Ampere Hour)

i.e. 0.1*300=30 Amperes

For Li-ION batteries, the charging characteristics per cell are as followed. The battery is initially charged with a constant current of 1.0 CA rate and switched over to constant voltage mode by giving 4.2 volts per cell until the charging current is reduced to a level below 3% of the rated 1.0 CA current. The Li-ION batteries can be operated with much higher depth of discharge compared to VRLA batteries; hence the float voltage for same application is usually high. For a typical 48 Volt, 300 AH bank, the Constant Current and Constant Voltage settings for Li-ion battery with typical cell voltage, of 3.3 volts is as given below:

Constant Voltage Set point=No of cells*Cell float voltage

16*3.6 volts=57.6 volts

Constant Current Set point=Charge rate*Capacity in Ampere hour

1 CA*300 Ah=300 Amperes

As can be seen, it is not possible to charge both Li-ION and VRLA batteries using a single charger. Since the float voltage of the Li-ION batteries are higher than the float voltage of VRLA batteries, the combined system can operate with lower energy density for Li-ION reducing overall efficiency of the backup power system.

To avoid this lowered efficiency, the charger is set for the current limit and float voltage required for Li-ION battery and the VRLA batter is charged using a pulse charging method. The charging current and the terminal voltage of the VRLA battery is monitored to determine the frequency and duty cycle of the pulses and as the VRLA battery gets charged, the duty cycle is lowered until the battery charging current drops to nearly zero (which means that the VRLA battery is now on float mode). During discharge, the Li-ION battery is discharged first and the VRLA battery is kept offline. As the Li-ION battery exhausts, at a pre-determined user-set limit the Li-ION battery is taken out of service and the VRLA battery is used to power the load. This scheme eliminates battery loop currents due to different voltage vs. state of charge characteristics of each battery chemistry type and consequently energy wastage.

The various embodiments herein provide a method for extending battery power at cell sites using a combination of VRLA and Li-ION batteries. The method of the present invention mixes the cell chemistries of the VRLA and Li-ION batteries and charges the combination of VRLA and Li-ION batteries with a single battery charger and a single rectifier.

The method of the present invention extends battery power at cell sites and also eliminates loop currents and consequently reduces energy wastage. The method of the present invention eliminates the use of multiple chargers for different battery chemistries.

The use of pulse charging method herein eliminates the need of programmatic control to the rectifier for dynamically configuring the charger for different charge currents for different chemistries of batteries.

The foregoing description of the specific embodiments will so fully reveal the general nature of the embodiments herein that others can, by applying current knowledge, readily modify and/or adapt for various applications such specific embodiments without departing, from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method for extending battery power at cell sites, said method comprising a step of charging a VRLA-Li-ION battery combination with a single charger circuit, said step of charging the VRLA-Li-Ion battery combination comprising the following steps:
    defining a pre-set current limit for the charger circuit;
    charging Li-Ion battery and VRLA battery with a float voltage;
    monitoring a charging current and a terminal voltage of the VRLA battery;
    determining a frequency and a duty cycle of one or more pulses for pulse charging of VRLA batteries;
    bringing the VRLA battery to an offline mode by determining a state of charge of the VRLA battery and making a pulse width to zero;
    discharging the Li-ION Battery at an initial stage; and
    using the VRLA battery to power the load as Li-Ion battery discharges to a pre-set charge limit.

2. A system for extending battery power at cell sites, said system comprising:
    a Li-ION battery and a VRLA battery in combination; and
    a charger circuit for the Li-ION and VRLA battery combination, wherein the charger circuit comprises:
        a Battery Control Module (BCM) to monitor the status of charging current, discharging current, voltage, state of charge, state of health of the Li-Ion battery;
        an Energy Management Controller (EMC); and
        a VRLA Controller Unit (VCU);
        at least two switches; and
        a rectifier for the cell chemistries of both the VRLA battery and the Li-ION battery;

wherein the charger circuit eliminates battery loop currents due to different voltage and state of charge characteristics of each battery chemistry type thereby extending the battery power.

3. The system of claim 2, wherein the Li-ION battery is the primary battery and the VRLA battery is the secondary battery.

4. The system of claim 2, wherein the VCU comprises:
a voltage sensor to determine a pack voltage of the VRLA battery, the state of charge of the batteries and the state of health of the batteries;
a current sensor to calculate a peak and an average charging and the discharging current;
a Pulse Width Modulation (PWM) control to a high current MOSFET switch;
a communication towards the EMC to send and receive the command, status, event and alarm information of the Li-ION and VRLA batteries with each other;
a disconnect relay to protect the VRLA battery.

5. The system of claim 2, wherein the EMC is connected to the VCU through an RS-232 Serial Port.

6. The system of claim 2, wherein the charging current through the VRLA battery is regulated by varying a pulse width of a high current switch based on the current read through the current sensor attached to a VRLA current path.

* * * * *